United States Patent
Messina et al.

(10) Patent No.: US 9,626,722 B2
(45) Date of Patent: Apr. 18, 2017

(54) SYSTEMS AND METHODS OF AN INTERFACE FOR USE IN ELECTRONIC TRADING

(75) Inventors: Patricia A. Messina, Chicago, IL (US); Dejan M. Srdjevic, Wilmette, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1389 days.

(21) Appl. No.: 12/582,489

(22) Filed: Oct. 20, 2009

(65) Prior Publication Data

US 2011/0093374 A1    Apr. 21, 2011

(51) Int. Cl.
*G06Q 40/04* (2012.01)
*G06F 3/0481* (2013.01)

(52) U.S. Cl.
CPC .......... *G06Q 40/04* (2013.01); *G06F 3/0481* (2013.01)

(58) Field of Classification Search
CPC .................................................... G06Q 40/04
See application file for complete search history.

(56) References Cited

U.S. PATENT DOCUMENTS

| | | | |
|---|---|---|---|
| 6,408,282 B1 * | 6/2002 | Buist ........................... | 705/36 R |
| 7,127,424 B2 * | 10/2006 | Kemp et al. .................... | 705/37 |
| 7,437,325 B2 | 10/2008 | Kemp, II et al. | |
| 7,693,780 B2 * | 4/2010 | Stearns ................... | G06Q 40/04 345/619 |
| 8,060,434 B1 * | 11/2011 | Mauro et al. .................... | 705/37 |
| 2002/0116288 A1 * | 8/2002 | Nakajima et al. ............... | 705/26 |
| 2008/0162378 A1 * | 7/2008 | Levine et al. .............. | 705/36 R |
| 2010/0076906 A1 * | 3/2010 | Eubank et al. ............. | 705/36 R |
| 2010/0293110 A1 * | 11/2010 | Rosenthal et al. .......... | 705/36 R |
| 2011/0040668 A1 | 2/2011 | Lee et al. | |
| 2011/0040669 A1 | 2/2011 | Lee et al. | |
| 2011/0093374 A1 * | 4/2011 | Messina et al. ................ | 705/37 |

* cited by examiner

*Primary Examiner* — Bruce I Ebersman

(74) *Attorney, Agent, or Firm* — McDonnell Boehnen Hulbert & Berghoff LLP

(57) ABSTRACT

Various systems and methods for presenting and interacting with electronic trading related information on a display screen of a computer system are provided. According to one or more embodiments, buttons are positioned and compressed along an axis, where each button corresponds to a function. A button can be selected through an action of a user input device. A button is removed from the region when a function corresponding to the button is no longer current and when the cursor is not positioned within the region. The remaining buttons, if any, in the region are compressed subsequent to removing the button from the region. A button is not removed from the region when the cursor is positioned within the region.

12 Claims, 6 Drawing Sheets

| | Spread | Leg | Del | Working | Price | Cross Inside | |
|---|---|---|---|---|---|---|---|
| 1 | BB1-BB2 | BB2 | Del | 5 | 215 | Cross Inside | |
| 2 | CC1-CC2 | CC2 | Del | 12 | 75 | Cross Inside | |

FIG. 2C

SYSTEMS AND METHODS OF AN INTERFACE FOR USE IN ELECTRONIC TRADING

BACKGROUND

The present inventions described herein are directed towards electronic trading. More particularly, the present inventions are directed towards interfaces, and aspects thereof, that are used to present electronic trading information on a display screen of a computer and allow a person to interact with the information.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices. An example of an electronic exchange is the CME® Globex® electronic trading platform, which is offered by the Chicago Mercantile Exchange Group.

To trade on an electronic trading system, a person will often use a computer to receive and electronically process data from the electronic exchange. The computer will generally output information to the person via one or more display screens. The person may also interact with the computer and the information using an input device, like a mouse or keyboard or both, which is in communication with the computer system. For example, the person may place trade orders, modify trade orders, and delete trade orders at the electronic exchange using the computer system and the input device.

Given the amount of data that is often viewed and processed by the user and the importance of speed in electronic trading, where microseconds can matter, it is useful to provide an interface that may enhance the user's performance in this kind of environment.

SUMMARY

There are a number of embodiments of the various present inventions described herein. In general, the present inventions are directed towards interfaces, and aspects thereof, that are used to present electronic trading information on a display screen of a computer and allow a person to interact with the information.

For example, certain embodiments of the present inventions provide a method for presenting electronic trading related information on a display screen of a computer system, including displaying on the display screen a region comprising one or more buttons that are positioned and compressed along an axis, where each button is associated with a trade order; receiving a command to select a first button in the region through an action of a user input device with a cursor of the user input device positioned over the first button to initiate at least one of modifying a trade order corresponding to the first button and canceling the trade order corresponding to the first button; removing a second button from the region when a trade order corresponding to the second button is no longer pending at the one or more electronic exchanges and the cursor of the user input device is not positioned within the region; compressing the one or more buttons in the region subsequent to removing the second button from the region; and refraining from removing the second button from the region when the order corresponding to the second button is no longer pending at the one or more electronic exchanges and the cursor is positioned within the region.

In another example, certain embodiments of the present inventions provide a method for presenting electronic trading related information on a display screen of a computer system, including displaying on the display screen a region comprising a plurality of buttons, where each button is configured to be selected with a user input device, and where a selection of each button initiates a function that corresponds to a trade order pending at an electronic exchange; moving a first button in the region upon an automatic command to move the first button and when the cursor of the user input device is not positioned within the region; and refraining from moving the first button in the region upon the automatic command to move the first button when the cursor is positioned within the region.

In yet another example, certain embodiments of the present inventions provide a computer readable medium having stored therein instructions for execution on a computer to perform the following method: displaying on the display screen a region comprising one or more buttons that are positioned and compressed along an axis, where each button is associated with a trade order; receiving a command to select a first button in the region through an action of a user input device with a cursor of the user input device positioned over the first button to initiate at least one of modifying a trade order corresponding to the first button and canceling the trade order corresponding to the first button; removing a second button from the region when a trade order corresponding to the second button is no longer pending at the one or more electronic exchanges and the cursor of the user input device is not positioned within the region; compressing the one or more buttons in the region subsequent to removing the second button from the region; and refraining from removing the second button from the region when the order corresponding to the second button is no longer pending at the one or more electronic exchanges and the cursor is positioned within the region.

Other embodiments, and aspects thereof, of the present inventions are described below. In addition, modifications may be made to the described embodiments without departing from the spirit or scope of the inventions.

BRIEF DESCRIPTION OF THE DRAWINGS

Example embodiments are described herein with reference to the following drawings.

FIGS. 2A, 2B, and 2C are example screen shots when features of certain embodiments described herein are turned ON.

FIG. 4 is an illustrative block diagram of locations being displayed on a display screen when features of certain embodiments described herein are turned ON.

Figure 1A:
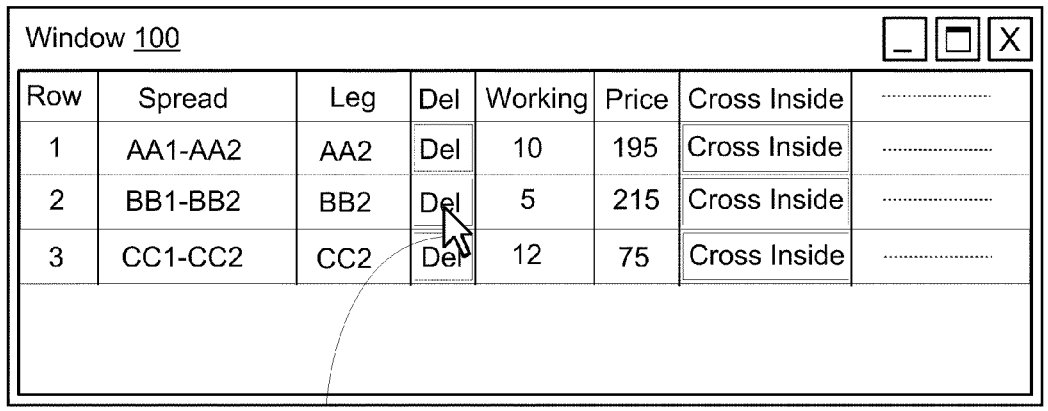
FIGS. 1A and 1B are example screen shots when features of certain embodiments described herein are turned OFF.

The following will be better understood by a person skilled in the art when read in conjunction with the figures which show various embodiments. The figures are for the purpose of illustrating certain embodiments, but it is understood that the various inventions are not limited to the arrangements and instrumentality shown in the drawings.

DETAILED DESCRIPTION

Various systems and methods are described herein for use in outputting electronic trading information on a display screen of a computer, for example, and for receiving input on the information from a person. Certain embodiments exemplify a computer-based output that is configured to make efficient use of screen space and also reduce, or eliminate, the number of mis-clicks (e.g., a selection of an unintended function) that could occur due to the dynamic nature of the interface.

Some embodiments are described below by illustrating when certain features are turned ON or OFF. According to some embodiments, for example, a feature may be turned ON or OFF manually by a user, automatically by the computer program itself, or manually by the user and automatically by the computer program, if so programmed. In other embodiments, for example, a feature is configured to not be turned OFF manually, automatically, or both manually and automatically. That is, the feature is intended to remain ON. Irrespective of whether a feature can be turned ON or OFF, the following examples are used to illustrate certain embodiments.

Figure 1B:
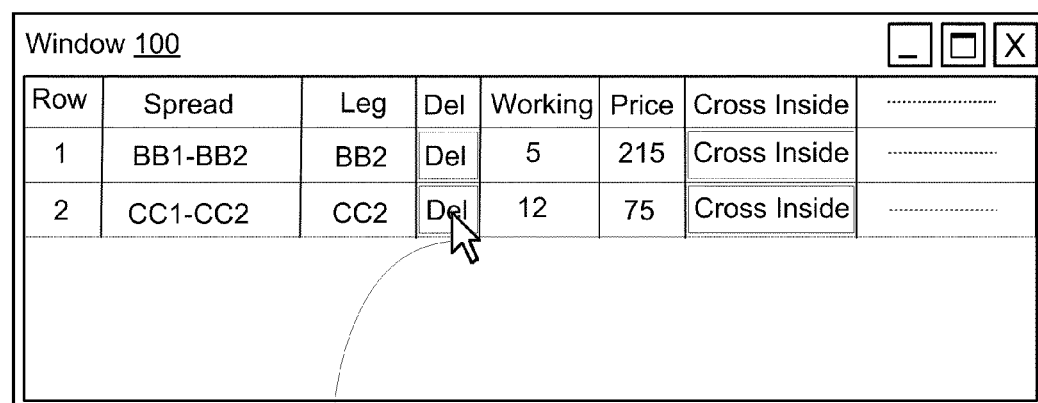

FIGS. 1A and 1B show example screen shots when certain features of some embodiments described more below are turned OFF. The screen shots are illustrations of a user interface for a computer program, more of which is described below, where the user interface provides a platform that allows the user to interact with the program. In certain embodiments, the screen shots are output on the display screen of a computer, where a computer is one or machines that is configured to manipulate data according to instructions.

Window 100 of FIG. 1A currently displays information pertaining to three separate trade orders, where each trade order is an order of a spread strategy between two or more different tradeable objects. In this instance, the trade orders are legged hedge orders resulting from the inability to finish the spread strategy. However, the trade orders could be representative of any type of trade order. With respect to the trade orders in window 100, spread strategies are known in the art. A user can configure a spread strategy using any number of commercially available spread trading tools. For example, the user could use a computer program package referred to as Autospreader®, which is offered by Trading Technologies International, and described in U.S. Pat. No. 7,437,325 to automatically configure and trade one or more spreads, where a spread broadly refers to a strategy of buying and/or selling two or more different tradeable objects.

Window 100 is configured to let a user manage open trade orders, i.e., manage trade orders that are currently pending (or working) in a market at the electronic exchange. Trade orders can be managed in a number of ways as is already known in the art; for example, a trade order can be deleted from the market or trade order parameter (e.g., price, quantity, buy/sell, and so on) can be changed while the order is pending in the market. The current configuration of window 100, however, lets the user delete a trade order by selecting "Del" on the appropriate button in the "Del" column and change an order price parameter by selecting "Cross Inside" on the appropriate button in the "Cross Inside" column. A button in window 100 can be selected, for example, with a cursor of a user input device like a mouse or keyboard positioned over the button during the action of selection (e.g., hovering a cursor over the button for a time without a click, single click of a mouse button, double click of a mouse button, depress a key on a keyboard, a combination of clicks, and so on).

In some embodiments, a button broadly refers to a user interface element that provides the user a way to trigger an event or confirm an action, for example. Graphically speaking, a button can possess any size or shape. For example, a button may be rectangular, round, rounded rectangular, triangle, or any other shape, if so programmed. A user may select a button by clicking it with a cursor controlled by a mouse device, but other input such as a keystroke can be used to execute the function of a button (e.g., a button with active focus). A button may require a user to simply press down on a mouse button to execute the function, click only once to execute the function, or the button may require two or more clicks to execute the function (e.g., a double-click). For ease of illustration, the word "click," "clicked," or "clicking" may be broadly used herein to refer to an act of selection, and can include any of a mouse button down action only, a single-click of a mouse button, a double-click of a mouse button, a key press on a keyboard, a combination of inputs, and so on. In some embodiments, selecting a button sends a command to the program and/or computer(s) to execute (or initiate) the function. A button might also indicate on the display screen when it has been selected.

As currently shown in window 100 of FIG. 1A, row 1 corresponds to an example spread strategy designated as "AA1-AA2," where AA1 is a first tradeable object and AA2 is a second tradeable object. Window 100 shows that there is a trade order working in the market to buy or sell a quantity of "10" of AA2 at a price of "195."

Row 2 currently corresponds to another example spread strategy designated as "BB1-BB2," where BB1 is a first tradeable object and BB2 is a second tradeable object. Window 100 shows that there is a trade order working in the market to buy or sell a quantity of "5" of BB2 at a price of "215."

Similarly, row 3 currently corresponds to a third example spread strategy designated as "CC1-CC2," where CC1 corresponds to a first tradeable object and CC2 corresponds to a second tradeable object. Window 100 shows that there is a trade order working in the market to buy or sell a quantity of "12" of CC2 at a price of "75."

Also shown in window 100 of FIG. 1A is a cursor 102, which may be controlled by a mouse, keyboard, trackball, or some other user input device. According to FIG. 1A, cursor 102 is currently positioned over a "Del" button that corresponds to row 2 and the trade order to buy or sell a quantity of "5" of BB2 at a price of "215." To delete the trade order, for example, the user may simply click on the corresponding button. Assume for this example that the user intends to delete the trade order for BB2.

FIG. 1B shows the screen shot of FIG. 1A, but at a moment in time later; which updated just before the user selected the button, for example. As can be seen from FIG. 1B, row 1 of FIG. 1A has been removed, which indicates that the trade order for AA2 is no longer working in the market. Removal of the row from the interface might happen unexpectedly to the user. For example, the trade order could have been matched with another order or deleted. Because the trade order for AA2 is no longer pending in the market, window 100 automatically removed the trade order from the view and shifted the other rows up in this instance to save screen area. Shifting the rows up is an example of compressing the rows so that gaps in the display region are filled, and consequently screen area is preserved. Likewise, buttons corresponding to trade orders for BB2 and CC2 are shifted up.

At this moment, row 1 currently corresponds to spread "BB1-BB2" and row 2 corresponds to spread "CC1-CC2." However, even though the user did not move the cursor 102 on the display screen, cursor 102 is now positioned over the "Del" button that corresponds to the trade order for CC2. If the user releases the mouse button at this moment, for example, the user will inadvertently delete the trade order for CC2; and not delete the originally intended trade order for BB2. This is an example of a mis-click. The time between FIG. 1A and FIG. 1B can be near instantaneous (for example, less than the time it takes for an average person to finish a click of a mouse button), such that a user can inadvertently delete (or change) a trade order due the possibility that one of the trade orders is removed from the view.

Screen shots of FIGS. 1A and 1B also show buttons "Cross Inside" that may be selected to change an order price parameter of a corresponding order. An order price parameter may be changed through a cancel and replace action or some other equivalent action. Other buttons may be placed in window 100 that are directed towards different functions like modifying order quantity or sending a trade order onto an exchange, for example. Irrespective of the type or function of a button, it is understood that a mis-click can occur if the screen is updated while the user is clicking a particular button.

Figure 2A:
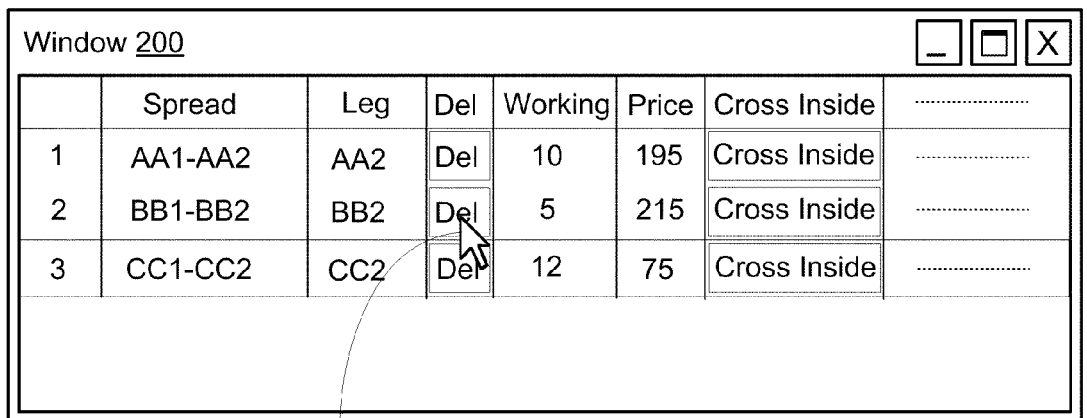
Figure 2B:
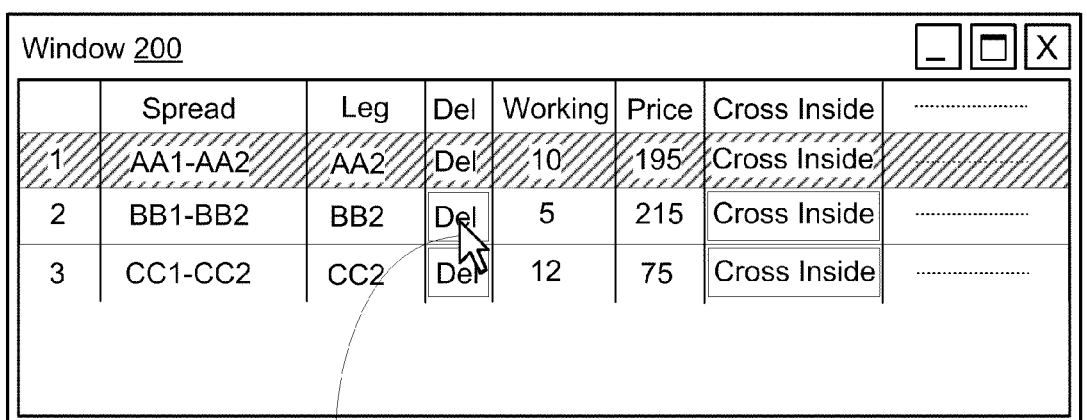

FIGS. 2A, 2B, and 2C show example screen shots when features of certain embodiments described more below are turned ON. Window 200 in FIG. 2A is essentially the same window as window 100 in FIG. 1A. According to FIG. 2A, cursor 202 is currently positioned over a "Del" button that corresponds to row 2 and the trade order to buy or sell a quantity of "5" of BB2 at a price of "215." Just as in FIG. 1A, to delete the trade order, for example, the user may simply click the button. Assume again that the user intends to delete the trade order for BB2.

FIG. 2B shows the screen shot of FIG. 2A, but at a moment in time later; which updated before the user selected the button, for example, to indicate that the trade order for AA2 is no longer working in the market. However, unlike FIG. 1B, the cursor 202 remains on the "Del" button for trade order BB2, so that if the user releases the mouse button at this moment, for example, the user will delete the intended trade order for BB2.

Also, according to FIG. 2B, row 1 is altered in a way to indicate to the user that the trade order for AA2 is no longer working in the market. Any kind of indication may be used to show the user that the trade order for AA2 is no longer working in the market. For example, the entire row, or a portion thereof, may be highlighted, grayed out, crossed out, hatched over, or the like, or a mark—like a check—could be displayed in alignment with the row. Regardless of the indication used, the interface can provide the user with a sign that the trade order is no longer working in the market.

In addition to, or in place of, providing an indication, any functionality associated with AA2 may be disabled. For example, the user may no longer be able to select options to delete or modify the trade order for AA2.

FIG. 2C shows window 200, which is at this moment similar to window 100 of FIG. 1B. That is, the row corresponding to the trade order for AA2 is removed and the remaining rows are shifted up to conserve screen space (e.g., the rows are compressed). This change occurs responsive to the cursor 202 moving out of a certain defined zone, more of which is described below. Now, it can be seen in window 200 that trade orders for BB2 and CC2 are still working in their respective markets.

Figure 3:
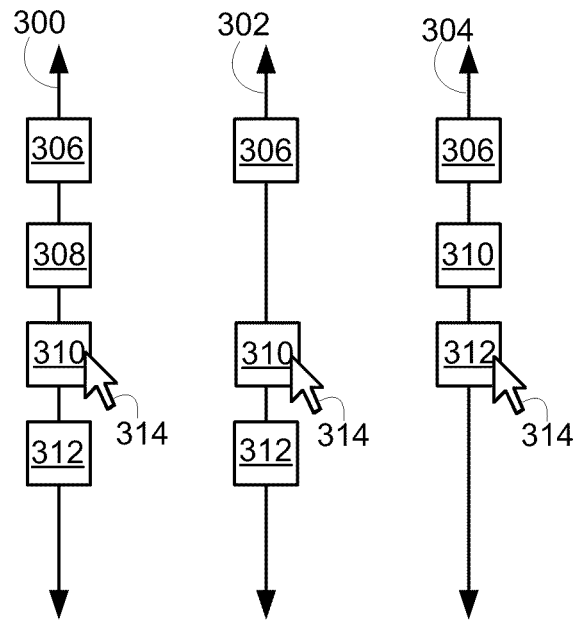
FIG. 3 is an illustrative block diagram of locations being displayed on a display screen when features of certain embodiments described herein are turned OFF.

FIG. 3 is an illustrative block diagram of buttons being displayed on a display screen when features of certain embodiments described herein are turned OFF. Looking to axis 300, there are four buttons 306, 308, 310, and 312; however, there can be any desired number of buttons displayed on a particular display screen, if so programmed and there is enough screen space. Buttons 306, 308, 310, and 312 may be similar to the buttons used to delete and modify trade orders in FIGS. 1A, 1B, 2A, and 2B. In other words, in certain embodiments, a button might include a graphical element that when activated, performs a specific function. As described above, a user can activate a button by, for example, clicking on it with mouse or, if the button has the focus, by hitting a key on a keyboard. In certain embodiments, a button might also include a number of pixels or x, y coordinates on the display screen that when selected or activated, performs a specific function.

In addition, it is understood that the buttons may not be associated with trade orders (the examples of FIGS. 1A, 1B, 2A, 2B, and 2C are associated with trade orders). Rather, certain embodiments may be useful in other user interfaces that behave in a similarly dynamic fashion and where buttons may be programmed to initiate or execute particular functions (not necessarily tied to trade orders or even electronic trading, for that matter).

In certain embodiments, selecting a button may be configured to initiate at least one of modifying a trade order or canceling the trade order. For example, selecting a button might cause a window (e.g., a separate area of the screen, a separate window, a pop-up window, or some other window or area) to be displayed. Depending on the button, the window will allow a user to modify a trade order, cancel a trade order, or both modify and cancel the trade order. A confirmation request might be programmed into the window to confirm a modification or cancellation of the trade order. According to another example, selecting a button might also include sending a message onto an exchange without a confirmation from the user, where the message is to modify or cancel a trade order, for instance.

In certain embodiments, selecting a button may be configured to initiate sending a new trade order to a market at an electronic exchange. A confirmation request may be programmed to appear upon selection of the button, if so desired. In some embodiments, selecting a button may be configured to send a new trade order message to the market at the electronic exchange without a confirmation request. In some embodiments, selecting a button may be configured to initiate or execute some other defined function.

Looking again to FIG. 3, axis 302 shows that button 308 is no longer available. Button 308 might be removed from the display if, for example, the function associated with the button is no longer current. For instance, if button 308 corresponded to the function of deleting or modifying a trade order, but the trade order is no longer working at the exchange, then a user could no longer delete or modify the trade order—i.e., the function of deleting or modifying the trade order is no longer current. As such, the system removes button 308 to conserve screen area and remove screen clutter. Axis 302 also shows an example of uncompressed buttons.

Axis 304 shows buttons 306, 310, and 312 compressed along the axis 304. In certain embodiments, it is desirable to compress buttons 306, 310, and 312 to remove a gap (or potential gap) along the axis. Thus, the gap shown along axis 302 is closed by compressing the buttons along the axis. In other words, the gap caused by removal of button 308 is filled with button 310. Compressing the buttons keeps the display current and it makes improved use of valuable, limited screen area by removing old, oftentimes irrelevant, data.

It is understood that the step of removing button 308 per axis 302 may not be transparent to the user, such that the user might only see buttons 306, 308, 310, and 312 per axis 300 on the screen display and then the buttons 306, 310, and 312 per axis 304 on the screen display. This would be similar to viewing FIG. 1A at time 1 and FIG. 1B at time 2, where time 2 could be a fraction of a second later than time 1.

FIG. 3 also shows that because the actual position of the cursor 314 did not substantially change on the screen from axis 300 through axis 304 (e.g., the user did not move the cursor 314), but the function of the button has changed (i.e., a function associated with button 310 changed to a function associated with button 312), it is possible for the wrong function to be activated. This illustration similarly highlights an issue with the display as does FIGS. 1A and 1B, when certain features are turned OFF.

It is worth noting that a button, or the user interface element that is used to represent the button, might not actually be shifted on the display screen when compression occurs. Instead, the interface may simply reassign a function to the button. For example, button 308 along axis 300 has a certain function assigned to it—call it function 1. Button 310 along axis 300 has a different function assigned to it—call it function 2. However, button 310 along axis 304 might actually use the same graphical element as button 308 along axis 300, except that the graphical element once assigned to function 1 is now assigned to function 2. As such, compression of buttons may also include a reassignment of functions.

Figure 4:
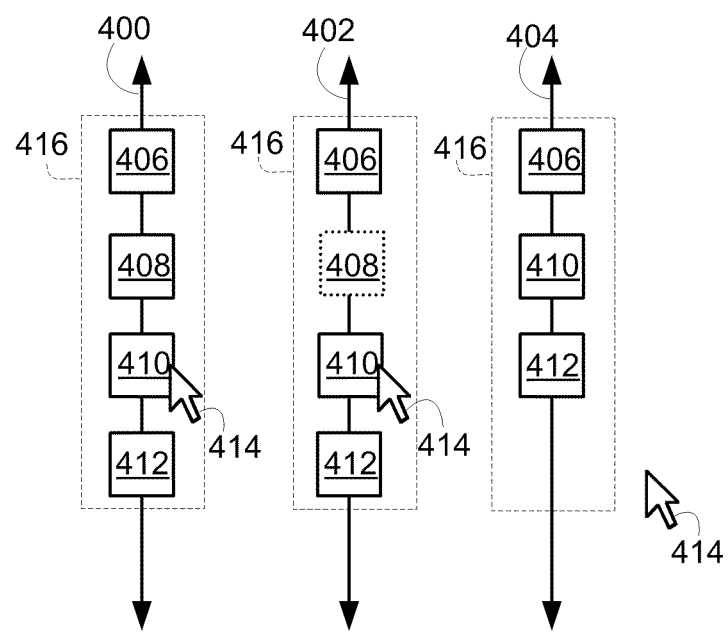

FIG. 4 is an illustrative diagram of buttons being displayed on a display screen when features of certain embodiments described herein are turned ON. Like FIG. 3, buttons 406, 408, 410, and 412 are shown along axis 400; however, there can be any reasonable number of buttons displayed on a particular display screen, if so programmed. Buttons 406, 408, 410, and 412 may be similar to the buttons used to delete and modify trade orders in FIGS. 1A, 1B, 2A, and 2B.

As shown in FIG. 4, buttons 406, 408, 410, and 412 are positioned and compressed along axis 400, where each button is assigned a function (e.g., a function to delete or modify a first trade order, a function to delete or modify a second trade order, and so on).

With respect to axis 402, the function associated with button 408 is no longer current. In certain embodiments, the system refrains from removing button 408 from the region when the function is no longer current and cursor 414 is positioned within the region 416. Button 408 is outlined using a dashed line to indicate that it is no longer current. Note that the boundary of region 416 may (or may not) be displayed to the user. As such, region 416 is shown in the figure for illustrative purposes. Additionally, region 416 could be defined in other ways; for example, a region may only include the buttons themselves (accordingly, a region can include multiple, distinct areas), a row, a column, or some other programmed area on the screen.

Per axis 404, in certain embodiments, button 408 is removed from region 416 when the function is no longer current and the cursor of the user input device is not positioned within region 416. Here, cursor 414 is shown outside of the region. Consequently, buttons 406, 410, and 412 are compressed subsequent to removing button 408 from region 416 to prevent a gap along the axis.

Figure 5:
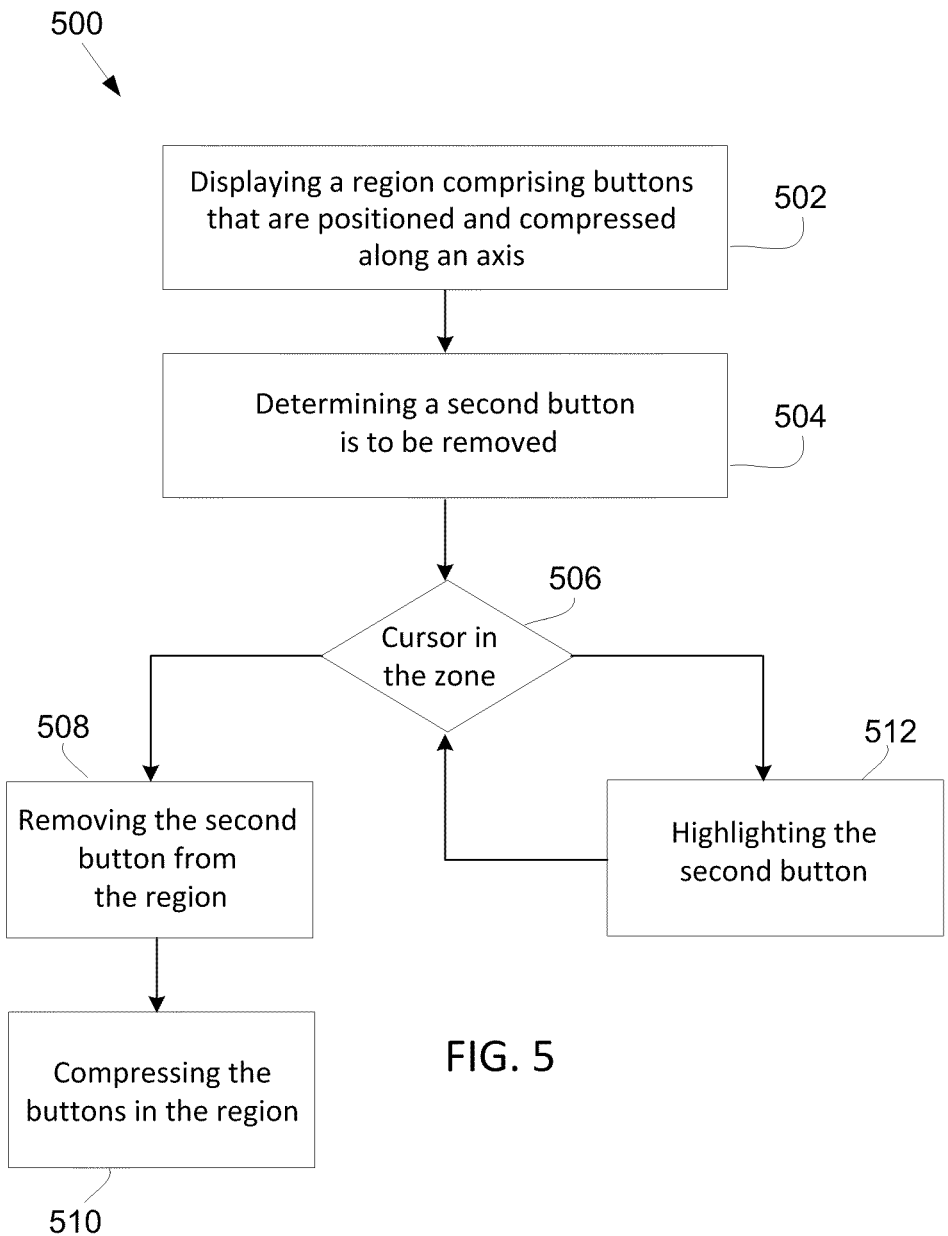
FIG. 5 is a flowchart illustrating an operation of certain embodiments described herein.

FIG. 5 is a flowchart 500 illustrating an operation of certain embodiments described herein. Flowchart 500 shows the functionality and operation of certain embodiments. In this regard, each block may be implemented alone or in combination in various forms of hardware, firmware, or as a set of instructions in software, for example. Certain embodiments may be provided as a set of instructions residing on a computer readable medium, such as a memory, hard disk, CD-ROM, DVD, or EPROM, for execution on a computer or other processing device. Alternative implementations are included within the scope of the example embodiments of the present invention in which functions may be executed out of order from that shown in flowchart 500 or discussed, including substantially concurrent or in reverse order, depending on the functionality involved, as would be understood by those skilled in the art.

At block 502, buttons on a screen display are positioned and compressed along a line or axis. For example, FIGS. 1A, 1B, 2A, 2B, 2C, 3 and 4 all show various kinds of buttons that are positioned along a vertically oriented axis (though, only an axis is visually illustrated in FIGS. 3 and 4). As can be clearly seen in the examples, compression of the buttons in all of the figures occurs in the same direction of the axis (e.g., compression occurs in a direction parallel to the axis). In certain embodiments, the line or axis may be oriented horizontally, in which case the compression would occur in a direction that is horizontal. In some embodiments, the line or axis may be oriented in other directions including a curved line or axis, and if such an orientation is used, the embodiments described herein are particularly useful when the compression of the buttons occurs in a direction along the line or axis.

At block 504, a button is to be removed. Oftentimes and as described above, a button is to be removed because the function associated with the button is no longer current. In some of the examples described above, a button's function is no longer current when the button corresponds to a trade order that is no longer working in a market.

At block 506, it is determined whether a cursor or focus is in a zone. The zone may be defined by a region on the display screen that encapsulates the one or more buttons. For example, in some embodiments, a zone might simply be the buttons themselves. That is, a cursor would be considered in the zone when the cursor is positioned over a button. Similarly, a focus (e.g., a component of the interface which is ready to be selected) would be considered in the zone when the focus is on a button. In some embodiments, a zone might include some screen area around the buttons in addition to the buttons themselves. In some embodiments, a zone might include an entire row or column associated with one or more of the buttons. In other embodiments, the entire window in which the buttons are displayed may be the zone. Irrespective of the zone boundary, it is determined whether the cursor or focus is in the zone.

At block 508, if the cursor is determined to not be in the zone, then the button (determined at block 504) is to be removed and per block 510, the button is removed and the remaining buttons (if any) are compressed.

At block 512, if the cursor is determined to be in the zone, then the button remains on the screen and the button is highlighted in such a way as to show the user that the button is no longer current. FIG. 2B illustrates an example of highlighting a button (and row) to indicate that the buttons that corresponds to trade order AA2 are no longer current. FIG. 4 also shows button 408 is no longer current by the use of a dashed line. However, by fixing the button on the screen when the cursor is in the zone, it increases the chances that the intended button is selected by the user.

Figure 6:
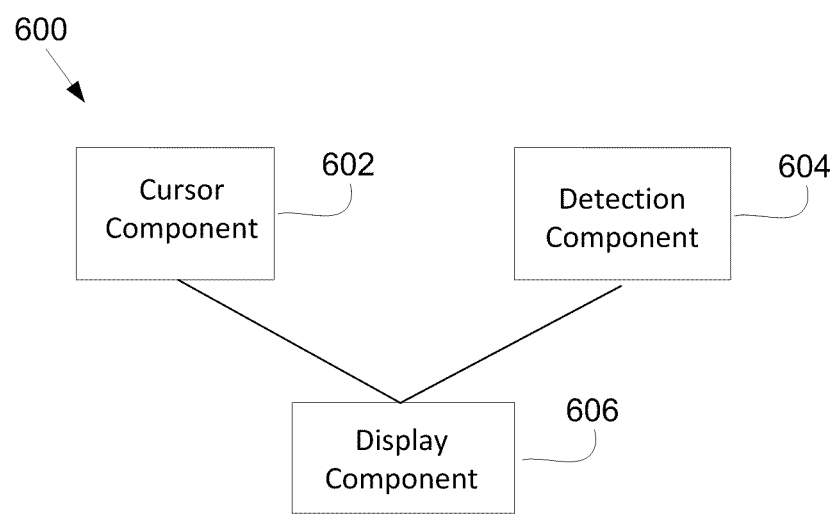
FIG. 6 is a block diagram of a system that can perform the operation of FIG. 5.

FIG. 6 is a block diagram of a system 600 that can perform the operation of FIG. 5. The system 600 includes a cursor component 602, a detection component 604, and a display component 606.

The display component 606 is in communication with the cursor component 602 and the detection component 604. In certain embodiments, the display component 606, the cursor component 602, and the detection component 604 are part of a client device. An example client device is a desktop computer. Another example of a client device is a server computer.

In operation, display component 606 displays, on a display screen of a computer, a region that includes one or more buttons that are positioned and compressed along an axis. In some embodiments, each button has a function that corresponds to a trade order pending at one or more electronic exchanges. In some embodiments, each button is configured to be selected through an action of a user input device with a cursor of the user input device positioned over the button to initiate at least one of modifying a trade order and canceling the trade order.

The detection component 604 is adapted to determine when a button is no longer current, and the cursor component 602 is adapted to determine when the cursor of the user input device is positioned within the region. If the button is no longer current and the cursor is not positioned within the region, then the button can be removed from the region via display component 606. The one or more remaining buttons may be compressed in the region subsequent to removing the button from the region to prevent a gap along the axis by removal of the button. However, if the button is no longer current, but the cursor is positioned within the region as determined by the cursor component 602, then the display component 606 refrains from removing the button from the region.

As used herein, a "tradeable object" refers to anything that can be traded with a price, a quantity, or both price and quantity. For example, financial products such as stocks, options, bonds, futures, currency, warrants, funds derivatives, commodities, and collections or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread. A tradeable object may also include traded events or goods, for example.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A computer-implemented method for presenting electronic trading related information on a display screen of a computer system, the method comprising:
    receiving, via a user input device of a computer system, a user input to manipulate a cursor displayed on a display screen of the computer system;
    displaying via the computer system on the display screen a region comprising a plurality of buttons that are positioned and compressed along an axis, wherein each button is associated with a trade order and is configured to be selected via the user input device of the computer system to initiate an operation on a corresponding trade order pending at an electronic exchange;
    receiving via the computer system a command to select a first button of the plurality of buttons in the region, the first button being associated with a first trade order and being selected through an action of the user input device to cause the cursor to be positioned over the first button to initiate at least one of modifying the first trade order corresponding to the first button and canceling the first trade order corresponding to the first button;
    monitoring, via the computer system, a position of the cursor with respect to the region to determine whether the cursor is within the region;
    determining, via the computer system, whether a second trade order corresponding to a second button is pending at the electronic exchange;
    in response to determining that the second trade order corresponding to the second button is no longer pending at the electronic exchange and that the cursor is not positioned within the region:
        removing via the computer system the second button associated with the second trade order from the region, and
        compressing via the computer system a remaining portion of the plurality of buttons in the region, where the remaining portion of the plurality of buttons in the region includes the first button and a third button corresponding to a third order; and
    in response to determining that the second trade order corresponding to the second button is no longer pending at the electronic exchange and that the cursor is positioned within the region:
        maintaining via the computer system at least a portion of the second button in the region.

2. The computer-implemented method of claim 1, further comprising:
    displaying an indicator in relation to the second button subsequent to maintaining the second button, wherein the indicator signals that the second trade order corresponding to the second button is no longer pending at the electronic exchange.

3. The computer-implemented method of claim 1, further comprising:
    sending a message to the electronic exchange to modify the first trade order corresponding to the first button responsive to selecting the first button in the region through the action of the user input device.

4. The computer-implemented method of claim 3, wherein the action consists of a single click of a button of the user input device.

5. The computer-implemented method of claim 1, further comprising:
    sending a message to the electronic exchange to cancel the trade order corresponding to the first button responsive to selecting the first button in the region through the action of the user input device.

6. The computer-implemented method of claim 5, wherein the action consists of a single click of a button of the user input device.

7. The computer-implemented method of claim 1, wherein the action consists of a single click of a button of the user input device.

8. The computer-implemented method of claim 1, further comprising:
opening a window for displaying information related to modifying the first trade order responsive to selecting the first button in the region through the action of the user input device.

9. The computer-implemented method of claim 1, further comprising:
opening a window for displaying information related to canceling the first trade order responsive to selecting the first button in the region through the action of the user input device.

10. The computer-implemented method of claim 1, wherein compressing comprises graphically moving a button on the display screen.

11. The computer-implemented method of claim 1, wherein compressing in the region comprises assigning a different function to at least one of the plurality of buttons.

12. A non-transitory computer readable medium having stored thereon instructions for execution on a computer to perform the following method:
receiving, via a user input device, a user input to manipulate a cursor displayed on a display screen of the computer system;
displaying on a display screen a region comprising a plurality of buttons that are positioned and compressed along an axis, wherein each button is associated with a trade order and is configured to be selected via the user input device of the computer system to initiate an operation on a corresponding trade order pending at an electronic exchange;
receiving a command to select a first button of the plurality of buttons in the region, the first button being associated with a first trade order and is selected through an action of the user input device to cause cursor to be positioned over the first button to initiate at least one of modifying the first trade order corresponding to the first button and canceling the first trade order corresponding to the first button;
monitoring a position of the cursor with respect to the region to determine whether the cursor is within the region;
determining whether a second trade order corresponding to a second button is pending at the electronic exchange;
in response to determining that the second trade order corresponding to the second button is no longer pending at the electronic exchange and that the cursor is not positioned within the region:
removing the second button associated with the second trade order from the region, and
compressing a remaining portion of the plurality of buttons in the region, where the remaining portion of the plurality of buttons in the region includes the first button and a third button corresponding to a third order; and
in response to determining that the second trade order corresponding to the second button is no longer pending at the electronic exchange and that the cursor is positioned within the region:
maintaining at least a portion of the second button in the region.

* * * * *